US012580958B1

(12) United States Patent　　　　　　(10) Patent No.:　US 12,580,958 B1
Mushtaq　　　　　　　　　　　　　　　　(45) Date of Patent:　　Mar. 17, 2026

(54) METHODS AND SYSTEMS FOR IDENTIFYING PHISHING ATTACKS

(71) Applicant: SlashNext, Inc., Pleasanton, CA (US)

(72) Inventor: Atif Mushtaq, San Ramon, CA (US)

(73) Assignee: Slash Next, Inc., Pleasanton, CA (US)

( * ) Notice: Subject to any disclaimer, the term of this patent is extended or adjusted under 35 U.S.C. 154(b) by 448 days.

(21) Appl. No.: 17/562,400

(22) Filed: Dec. 27, 2021

Related U.S. Application Data

(60) Provisional application No. 63/134,509, filed on Jan. 6, 2021.

(51) Int. Cl.
　　*H04L 9/40*　　　　(2022.01)
　　*G06F 9/54*　　　　(2006.01)
(52) U.S. Cl.
　　CPC .......... *H04L 63/1483* (2013.01); *G06F 9/541* (2013.01); *H04L 63/1416* (2013.01); *H04L 63/302* (2013.01)
(58) Field of Classification Search
　　CPC ............. H04L 63/1483; H04L 63/1416; H04L 63/302; G06F 9/541

USPC .......................................................... 726/23
See application file for complete search history.

(56) References Cited

U.S. PATENT DOCUMENTS

| | | | | |
|---|---|---|---|---|
| 10,079,876 | B1 * | 9/2018 | Chung | ................... H04W 12/08 |
| 10,348,767 | B1 * | 7/2019 | Lee | ...................... H04L 63/0236 |
| 10,764,313 | B1 | 9/2020 | Mushtaq | |
| 2017/0374089 | A1 * | 12/2017 | Anderson | .............. G06N 20/00 |
| 2020/0204587 | A1 * | 6/2020 | Hunt | ...................... G06F 21/128 |

* cited by examiner

*Primary Examiner* — Linglan Edwards
*Assistant Examiner* — Phuc Pham

(57)　　　　　　　　ABSTRACT

Provided are systems, software, and methods for phishing analysis and detection. The provided systems, software, and methods may comprise interfaces configured to capture and scan network session activity in real-time to detect a phishing attack using a set of trained machine learning classifiers, detect a phishing attach, classify the attack into one or more phishing classes, block the phishing attack and provide a safe preview of the blocked phishing attack. The machine learning classifiers may be deployed remotely. The systems, software, and methods may further comprise a web application programing interface configured to integrate the one or more analysis interfaces into at least one external software or application.

20 Claims, 6 Drawing Sheets

```
Malicious Host
{
        "errorNo"         : "0",
        "errorMsg"        : "Success",
        "threatData"      :
        {
                "verdict"           : "Malicious",
                "threatStatus"      : "Active" | "No Longer Active",
                "threatType"        : "Phishing and Social Engineering" | "Malware & Exploit" | "Callback/C2",
                "threatName"        : "Fake Login Page" | "Scareware" | "Rouge Software" | "Internet Scam" | etc
                "firstSeen"         : "mm-dd-yyyy hh:mm:ss UTC",
                "lastSeen"          : "mm-dd-yyyy hh:mm:ss UTC"
        Benign Host
        {
                "errorNo"         : "0",
                "errorMsg"        : "Success",
                "threatData"      :
                {
                        "verdict"           : "Benign",
                        "threatStatus"      : "N/A",
                        "threatType"        : "N/A",
                        "threatName"        : "N/A",
                        "firstSeen"         : "mm-dd-yyyy hh:mm:ss UTC",
                        "lastSeen"          : "mm-dd-yyyy hh:mm:ss UTC"
        Host Not Found
        {
                "errorNo"           : "0",
                "errorMsg"          : "Success",
                "threatData"        :
                {
                        "verdict"           : "Unrated, No Intel Found",
                        "threatStatus"      : "N/A",
                        "threatType"        : "N/A",
```

```
"url"              : {complete submitted URL},
"scanId"           : {submitted URL unique scan id},
"threatData"       : <this shall only be populated in case 'verdict' is 'Malicious'>
{
        "verdict"          : {submitted URL verdict of the URL reputation API execution},
        "threatStatus"     : {status of threat posed by submitted URL},
        "threatType"       : {type of threat posed by submitted URL},
        "threatName"       : {name of threat posed by submitted URL},
        "firstSeen"        : {threat first observed time in UTC},
        "lastSeen"         : {threat last observed time in UTC}
},
"finalUrl"         : <this shall only be populated if the submitted URL is a re-director to the same domain>
or
"landingUrl"       : <this shall only be populated if the submitted URL is a re-director to the different domain>
{
        "url"              : {complete landing URL},
        "scanId"           : {landing URL unique scan id},
        "threatData"       : <this shall only be populated in case 'verdict' is 'Malicious' or 'Suspicious'>
        {
                "verdict"          : {landing URL verdict of the URL reputation API execution},
                "threatStatus"     : {status of threat posed by landing URL},
                "threatType"       : {type of threat posed by landing URL},
                "threatName"       : {name of threat posed by landing URL},
                "firstSeen"        : {threat first observed time in UTC},
                "lastSeen"         : {threat last observed time in UTC}
```

*FIG. 6*

METHODS AND SYSTEMS FOR IDENTIFYING PHISHING ATTACKS

CROSS-REFERENCE TO RELATED APPLICATIONS

This application claims the priority and benefit of U.S. Provisional Application No. 63/134,509 filed on Jan. 6, 2021, the entire content of which is incorporated herein by reference.

BACKGROUND

Driven by an increase in global connectivity and usage of online services, more personal and business data are under cyber threat more than before. Cybersecurity is the practice of protecting networks, systems, hardware and data from cyber threats. Traditional security measures included manual or semi-automatic processing of emails or websites by, for example, analyzing domain reputation. Attackers, on the other hand, employ new methods powered by social engineering and artificial intelligence to circumvent these traditional security controls. As such, cyber attacks are an increasingly sophisticated and evolving danger to individuals and businesses. Therefore, there is a need for novel solutions to identify the sophisticated and evolving attacks.

SUMMARY

Recognized herein is a need for anti-phishing methods and systems for stopping multi-vector, multi-payload phishing and social engineering attacks on all major platforms particularly on the web, social media, SMS (Short Messaging Service) and others. It would also be advantageous for such a universal detection method and system to conduct real time inspection of web traffic, and SMS and chat messages and integrate with current software application interfaces.

Traditional cybersecurity techniques such as malware sandboxes can be useful for analyzing malicious binaries and exploit and play a critical role for security teams to perform incident response routines. However, malware sandboxes are not designed for analyzing phishing and social engineering websites and phishing messages such as those coming through SMS, IM (Instant Messaging), Chat and social media posts, etc.

The lack of a behavior analysis environment specially designed to detect and respond to phishing and social engineering attacks leaves the security teams to manually investigate such non-malware attacks or use less sophisticated techniques like domain reputation and signatures. A behavior analysis engine is needed to fill this gap. These attacks are not only growing in sophistication but also in volume, affecting more individuals and businesses on a routine basis. Manual or even semi-manual processing of such volumes of attacks may fall short. Therefore, an automated and smart solution that can be applied in scale without the need for human supervision is needed. Furthermore, it is desirable for the solution to be capable of being integrated into current security protection software and applications used by security protection teams and software developers.

The present disclosure provides systems, software, and methods for phishing analysis and detection. The systems, software, and methods may comprise one or more analysis interfaces configured to capture and scan network session activity in real-time to detect a phishing attack using a set of machine learning algorithm trained classifiers, detect a phishing attack, classify the attack into one or more phishing classes, block the phishing attack and provide a safe preview of the blocked phishing attack. The machine learning classifiers may be deployed remotely. The systems, software, and methods may further comprise a web application programing interface configured to integrate the one or more analysis interfaces into at least one external software or application.

In an aspect, a system for phishing analysis and detection is provided. The system comprises: one or more analysis interfaces configured to capture and scan network session activity in real-time to detect a phishing attack, classify the phishing attack into one or more classes using a plurality of machine learning algorithm trained classifiers; and one or more application programing interfaces (APIs) configured to integrate the one or more analysis interfaces into at least one external software or application and provide enrichment information related to the detected phishing attack.

In some embodiments, the one or more analysis interfaces are configured to further block the phishing attack and provide a safe preview of the blocked phishing attack. In some embodiments, the one or more analysis interfaces comprise a first analysis interface for uniform resource locator (URL) analysis and enrichment and a second analysis interface for message analysis and enrichment. In some cases, the first analysis interface is coupled to a virtual browser analysis module deployed on a cloud. In some instances, the virtual browser analysis module is configured to collect forensic intelligence on a candidate webpage behavior during an interaction with the candidate webpage within a virtual browser. In some examples, the virtual browser analysis module is further configured to identify the phishing attack based on the forensic intelligence and return information about the phishing attack to the virtual browser analysis module. In some examples, the enrichment information comprises a preview of the candidate webpage if the phishing attack is detected. In some instances, the virtual browser analysis module is configured to follow a URL and the phishing attack in multiple stages and analyze a destination webpage of the phishing attack.

In some cases, the second analysis interface is coupled to a message analysis engine comprising a set of machine learning algorithm trained classifiers for classifying the phishing attack. In some instances, the set of machine learning algorithm trained classifiers correspond to a set of phishing classes and each of the set of machine learning algorithm trained classifiers is configured to extract features based on the corresponding phishing class. The extracted features may comprise a subset of features shared by two or more of the set of machine learning algorithm trained classifiers. The extracted features may comprise a subset of features specific to one of the set of machine learning algorithm trained classifiers.

In some embodiments, the system may further comprise a link inspection module configured to detect whether the network session activity contains a URL link prior to analyzing the network session activity with the one or more analysis interfaces. In some embodiments, the one or more application programing interfaces (APIs) comprise a web API providing an API response related to a reputation of a host or alternatively related to a reputation of a URL.

In another aspect of the present disclosure, a method for phishing analysis and detection is provided. The method comprises: analyzing, with aid of one or more analysis interfaces, network session activity in real-time to detect a phishing attack, classify the phishing attack into one or more classes using a plurality of machine learning algorithm trained classifiers; and providing one or more application programing interfaces (APIs) to integrate the one or more analysis interfaces into at least one external software or application and provide enrichment information related to the detected phishing attack.

In some embodiments, the one or more analysis interfaces comprise a first analysis interface for uniform resource locator (URL) analysis and enrichment and a second analysis interface for message analysis and enrichment. In some cases, the first analysis interface is coupled to a virtual browser analysis module deployed on a cloud.

In some embodiments, the one or more application programing interfaces (APIs) comprise a web API providing an API response related to a reputation of a host or alternatively related to a reputation of a URL.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 5 shows examples of different host reputation API responses.

FIG. 6 shows an example of a response returned by a URL reputation API.

DETAILED DESCRIPTION

Figure 1:
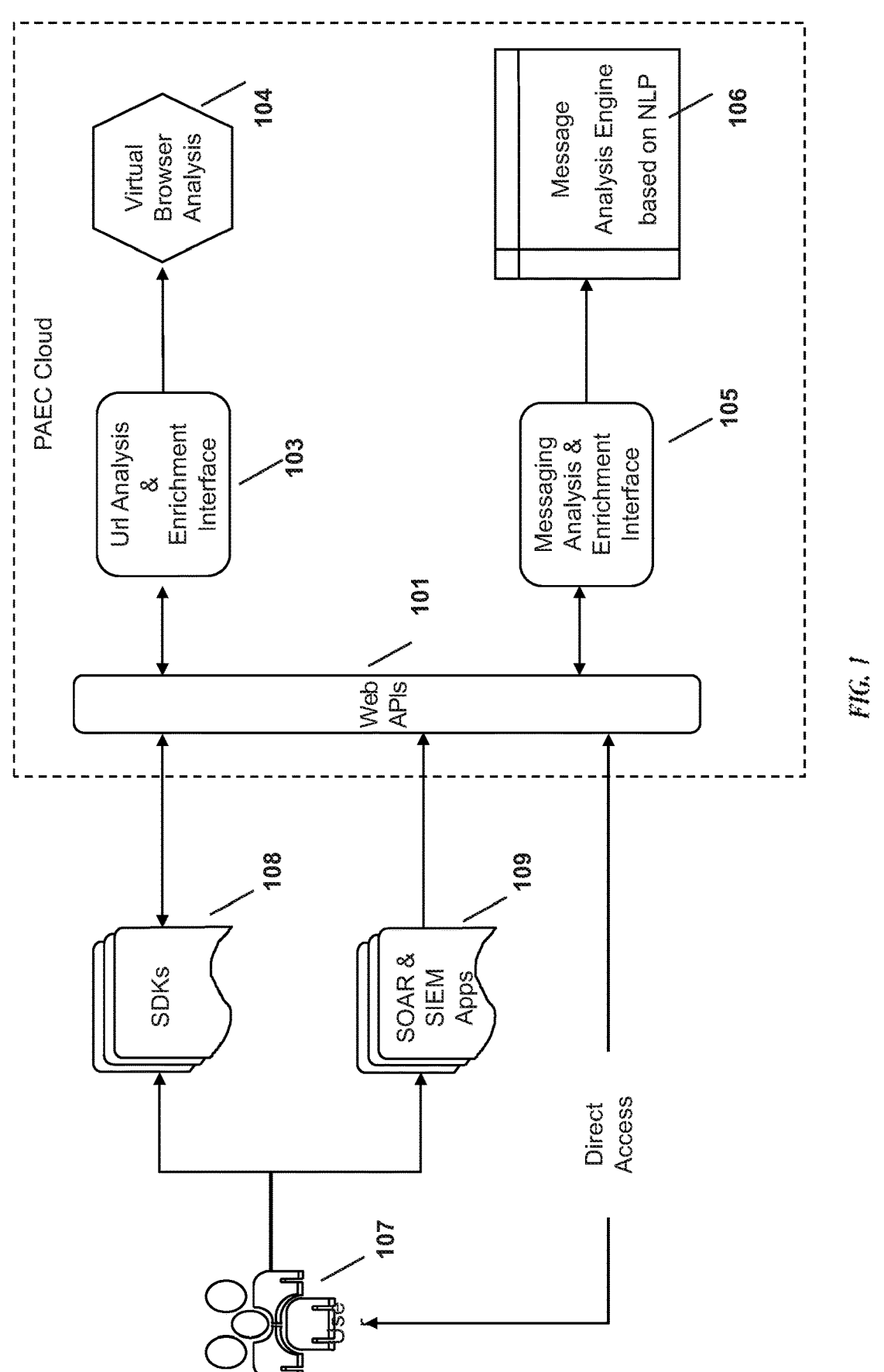
FIG. 1 shows a flow diagram of a phishing analysis system architecture.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Systems and methods of the present disclosure may effectively protect endpoints devices by automatically inspecting network traffic and SMS messages in real time and detecting and blocking different types of phishing attacks. In particular, the systems, software, and methods provide a cloud-based engine to analyze a cyber-attack automatically and at scale. The systems, software, and methods may comprise an improved interface such as a rich application programming interface (API) that may allow integration into current security protection software applications, and to handle a variety types of users and use-cases. The interfaces may be configured to capture and scan network session activity in real-time to detect a phishing attack using a set of machine learning algorithm trained classifiers, detect a phishing attack, classify the attack into one or more phishing classes, block the phishing attack and provide a safe preview of the blocked phishing attack. The machine learning classifiers may be deployed remotely. The systems, software, and methods may further comprise a web application programing interface configured to integrate the one or more analysis interfaces into at least one external software or application.

Systems and methods herein may effectively protect endpoints devices and users by performing real-time detection and blocking different types of cyber-attacks. In some cases, a cyber attack may comprise a phishing attack. The phishing attack may be embedded in a webpage, in an email message, in a text message (e.g., in SMS (short messaging service) or in MMS (multimedia messaging service)), or in a phone call. In some cases, the methods and systems described herein may comprise a cloud-based engine to perform the analysis of an attack on a virtual browser to prevent any threats to the user. For example, in order to analyze a web-based phishing attack on the internet, one or more URL (uniform resource locator) re-directs of the attack and/or a multistage attack are followed on a virtual browser to identify and analyze a final destination webpage associated with the phishing attack. This method may be used to detect phishing URLs and/or webpages. The URLs and/or webpages may be hosted on a legitimate yet compromised website where techniques that depend on domain reputation may fail.

In some cases, the phishing attack may be embedded within a message (e.g., chat, SMS, etc.). The systems and methods described herein may employ a series of artificial intelligence (AI) techniques such as natural language processing (NLP) to identify and analyze the attack. The NLP techniques may be employed to understand the message's context. Furthermore, the sender's identity information may be captured and extracted from, such as phone number, social media handle associated with a user and analyzed along with the message context. In some cases, the extracted contextual information along with the sender's identity may be analyzed for determining an intent of the attack. For example, an intent to exploit human emotions (e.g., reward, fear, or trust) as a lure may be identified. The human emotions may be exploited by the phishing attack to, for example, steal information, conduct a telephone fraud, or install malicious software.

Also disclosed herein systems, software, and methods for enriching data to provide post-detection forensic and meta information. The enrichment systems and methods may comprise one or more enrichment application programming interfaces (APIs). The enrichment systems and methods may provide enrichment functions through the APIs and provide enrichment information related to an attack's origin, type, context or others to a user. For example, a phishing site information (e.g., a screenshot of the website), rendered text, HTML (Hypertext Markup Language), phishing payload type (e.g., credential stealing, telephone scam, gift scam, scareware, etc.) can be provided to a user. In some cases, the user can utilize the information provided by the enrichment APIs to prevent an attack, devise a counter-threat plan, or improve security. A user may inform potential targets of a phishing attack of the phishing attempt and the content to prevent the attack. In some cases, the user may block or prevent access to a certain website or a phone-number as a security measure.

In some cases, the phishing analysis, and enrichment systems and methods may be fully automated. The systems and methods herein may perform phishing analysis and provide enriched data to a user without any human intervention (e.g., supervision, input, or control). The systems and methods may be implemented in a cloud-based engine. In some cases, a user can access the cloud-based engine and/or the phishing analysis and enrichment systems via web APIs, a software development kit (SDK), or a security information and event management platform. The cloud-based engine and/or the phishing analysis and enrichment systems may be integrated into a variety of Security Information and Event Management (SIEM) systems and/or existing third-party systems, security orchestration, automation and response (SOAR), Unified endpoint management (UEM), threat Intelligence Platform (TIP), etc. via the enrichment APIs.

The phishing analysis and enrichment systems and methods may comprise one or more enrichment APIs and a cloud-based engine. FIG. 1 shows an example of phishing analysis and enrichment system 100. The phishing analysis and enrichment system 100 may be a cloud-based system. In some cases, the phishing analysis and enrichment system 100 may also be referred to as the phishing analysis and enrichment cloud (PAEC) system which are used interchangeably throughout the specification.

The PAEC system may comprise a plurality of APIs. For example, an API 101 (e.g., web APIs) may provide an integration point to the PAEC system allowing for an easy integration into a current, existing or third-party SDK 108, SOAR and SIEM applications and/or user applications (e.g., social media apps, messaging service, etc.). In some cases, the plurality of APIs may include one or more enrichment APIs such as a URL analysis and enrichment interface 103, a message analysis and enrichment interface 105 or a real-time phishing lookup API (RTPL). The RTPL may provide a unified API interface to integrate real-time URL reputation and/or scanning capabilities into platforms and products of a user. The one or more enrichment APIs or interfaces may be coupled to one or more cloud-based analytic components. For instance, the URL analysis and enrichment interface 103 may be coupled to a virtual browser analysis module 104. The message analysis and enrichment interface 105 may be coupled to a message analysis engine. Details about the one or more enrichment APIs, interfaces and analytic components are described later herein.

The virtual browser analysis module 104 may be used to analyze a phishing attack on the web without compromising the user's information or resources. The virtual browser analysis module may dynamically inspect page contents to identify phishing threats while simultaneously retrieving detailed forensic evidence, including screenshots, HTML, rendered text and various other data. The virtual browser analysis may be used to investigate a server employing evasion techniques. For instance, the cloud-based engine i.e., virtual browser analysis module, may mimic as a normal client to interact with the candidate suspicious webpage, collect forensics intelligence during the interaction and analyze the forensics intelligence to determine the candidate webpage as benign or malicious. The candidate webpage may be loaded into a browser memory for further examination. Extracting these artifacts from the browser memory instead of fetching it directly from the web server may avoid opportunities for encryption, obfuscation and encoding. For example, an invisible browser window may be launched in the cloud and subsequently, the URL of the candidate page may be opened inside the browser and the brand page may be loaded, rendered, and stored in the browser memory.

The virtual browser analysis module 104 may load the candidate webpage to a virtual browser memory, interact with the candidate webpage as a normal client and collect the forensics intelligence on the candidate webpage behavior. As described above, a malicious sever may perform different types of evasion techniques to avoid detection. For example, a malicious server may present a variety of challenge-response type of tests such as image challenge, text challenge, audio challenge, or random popups/dialogues on the screen before showing the actual content or actual phishing page. The virtual browser analysis module 104 may interact with the probed server by responding to the challenge-response tests with aid of virtual keyboard and/or virtual mouse. For example, the virtual browser analysis module may interact with the browser through keyboard and mouse simulation APIs. Browsers usually offer Web Drivers that allow interaction with browser software through APIs to simulate keyboard input and mouse movement. Using the keyboard and mouse simulation APIs, a browser can accept input as if it's coming from a hardware based keyboard or mouse.

Forensics intelligence on the candidate webpage behavior may be collected during the interaction with the candidate webpage by the virtual browser analysis module. For example, a credential stealing page may accept dummy credentials generated by the virtual browser analysis module since it does not have the correct credential. In another example, after the virtual browser analysis module responding to the challenge test, the candidate webpage may expose the actual phishing page. The intelligence collected during the interaction along with data extracted from the artifacts may be analyzed and used to determine whether the candidate page is malicious or benign. For example, the intelligence and the artifacts may be supplied to a machine learning trained model as input data and the output may indicate whether the candidate page is malicious or benign. The result (e.g., type of malicious payload, source, target of the attack, etc.) may then be returned to the URL analysis and enrichment interface 103 to trigger an alert if the webpage is determined to be malicious. In some cases, the result may be used by the URL analysis and enrichment interface 103 to provide enrichment data about the phishing attack. For instance, the enrichment data may include information related to the attack such as time, why the webpage is blocked, the type of threat, the detected and blocked URL, a preview of the blocked webpage in a safe mode (e.g., screenshot of the fraudulent webpage) and various other enrichment data.

In some cases, the virtual browser analysis module 104 may further comprise one or more modules to follow URL links (e.g., URL re-directs) of the attack. In some cases, the phishing attempt may be a multistage attack that may progress gradually in multiple steps. This beneficially allows for detection of phishing URLs/webpages hosted on compromised websites and legitimate hosting infrastructure where domain reputation technique will fail. A multistage attack may gain knowledge of a target in each stage, which prepares for a next stage of the attack. The virtual browser analysis module 104 may follow the multistage attack to identify a potential target of the attack, the source (e.g., a website), a malicious payload (e.g., a worm, a virus, a ransomware, a scareware, a gift scam, etc.), resources that may be compromised by the attack, information that can be extracted by the attack, and the like. The malicious payload may be a component of the attack responsible for the execution of an activity to harm the target.

The system (e.g., virtual browser) may operate within a virtual browser memory rather than extracting them directly from the networks session so as to avoid encryption, obfuscation, and encoding. The virtual browser may block a URL pre-encryption thereby protecting users from web attacks that may not be effectively defended using the traditional man-in-the middle and DNS interception. The information may then be sent to an API to be provided to the user in an intuitive and safe manner. For example, users who attempt to browse to a malicious site may be blocked and receive an informative warning page allowing them to access a Safe Preview screen shot of the blocked page along with useful information about the threat.

In some cases, a blacklist matching may be included using a high-speed engine configured to compare device SMS and Web data against a cloud blacklist feed. If there is a match, malicious traffic may be blocked, and a warning alert can be generated. If no match is detected, the engine may let the traffic (e.g., SMS, web data) route to the original destination.

The URL analysis and enrichment interface 103 may communicate with the virtual browser analysis module 104, receive the behavioral (e.g., collected during interaction with a server) and forensic information as described above and generate enriched information about the attack or server. For example, the URL analysis and enrichment interface 103 may effectively identify and remediate phishing threats on compromised machines with real-time webpage analyses, fully automate analyzing the emails sent by users and the public to online brand abuse inboxes, detect brand impersonators and malicious URLs using deep inspection of website content, packages and other information as described elsewhere herein. Details about the enrichment interface or enrichment APIs are described later herein.

The message analysis and enrichment interface 105 may be configured to analyze the content of the phishing attack message. The phishing message may employ social engineering techniques to gain access to a user's resources (e.g., financial data, sensitive information, etc.). In a social engineering attack, an attacker uses human interaction (social skills) to obtain or compromise information associated with a target (e.g., an organization or an individual). Analyzing the contents of a message (e.g., in a chat, SMS, or a phone call) may reveal malicious activities (e.g., phishing attack). The message analysis and enrichment interface 105 may be in communication with or include a message analysis engine 106 comprising an NLP and/or other AI algorithms to scan these messages. The scanning may be performed in real-time. The message analysis engine 106 may then block and or quarantine a phishing attempt (e.g., a phishing campaign). Further details about the message analysis and enrichment interface or and enrichment APIs are described later herein.

Also shown in FIG. 1, a user 107 may interact with the APIs 101 (e.g., web APIs) directly. Additionally, the APIs may be integrated into an SDK 108, a SOAR and STEM application 109, or a combination thereof.

Figure 2:
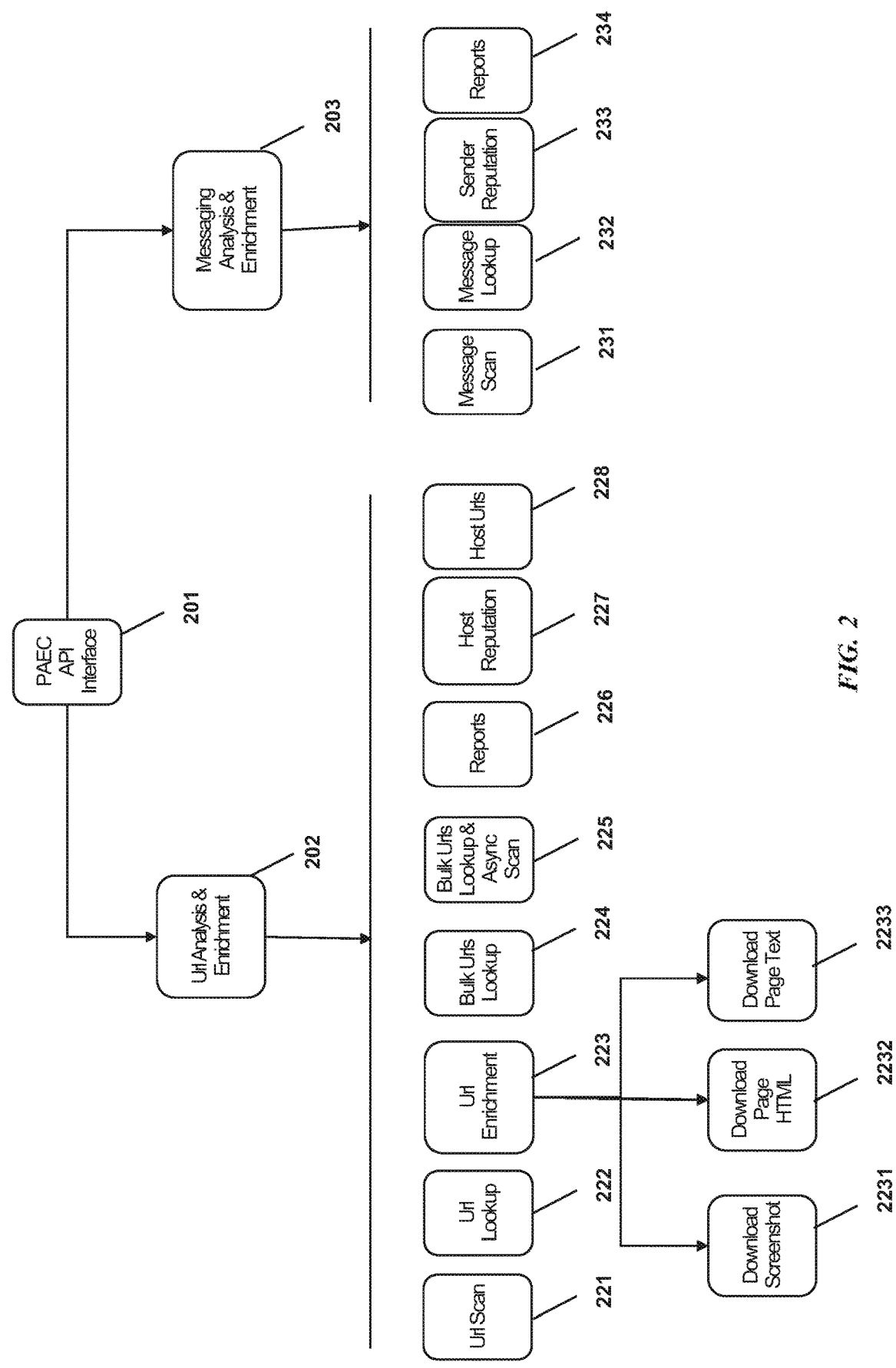
FIG. 2 shows certain elements of a phishing analysis application programming interface (API) for an exemplary system and method.

FIG. 2 is a schematic illustration of the phishing analysis and enrichment cloud (PAEC) system API interface 201. The PAEC system may comprise one or more interfaces or enrichment APIs. In some cases, the PAEC system may comprise a URL analysis and enrichment interface 202 and a messaging analysis and enrichment interface 203. The URL analysis and enrichment interface 202 can be the same as the URL analysis and enrichment interface as described in FIG. 1. The URL analysis and enrichment interface 202 may comprise a variety of enrichment functions including, but not limited to, URL scan 221, URL lookup 222, URL enrichment 223, bulk URL lookup 224, bulk URL lookup and async scan 225, reports 226, host reputation 227, host URLs 228 or other functions.

The URL analysis and enrichment interface may provide URL enrichment data. In some cases, the URL enrichment data provided by the URL analysis and enrichment interface may comprise download screenshot 2231, download page HTML 2232, download page text 2233, and/or other data extracted from URL analysis as described elsewhere herein.

For a target URL, the URL lookup API 222 may comprise performing a search query into a Threat intelligence database to examine if the URL is matched with a malicious source. If a match is found, the URL may be determined to be malicious, otherwise benign. If a URL is malicious, enrichment data (e.g., detailed forensics information) may be produced and provided to the user or an API interface by the enrichment interface. The enrichment data provided to a user or an API may comprise Phishing screenshots, HTML and text, or artifacts. The Threat intelligence database may comprise a real-time database of phishing URLs, domains, and related forensics. The system may search the web or other resources to compile the threat intelligence database, as described herein.

For a target URL, the URL Scan API may comprise performing a search query into the Threat intelligence database to examine if the URL can be matched with a malicious source. If a match is found, the enrichment interface may return a malicious verdict; if no match is found, the URL may be examined for a real-time scan using the Virtual Browser. The URL Scan may detect unknown attacks that do not already exist in the Threat intelligence database. The URL Scan API may support both Sync and Async modes. If a URL is malicious, the enrichment interface may provide enrichment data (e.g., detailed forensics information) to the user or a web API as described herein. The enrichment data may comprise Phishing screenshots, HTML and text, etc. A plurality of URLs can be provided by the user for scanning using the bulk URL scan API. In the bulk URL scan API, the scanning may be performed as an async process. The URL lookup API may also be called (e.g., by the user or an API) to check a URL's status (e.g., malicious or benign).

The bulk URL lookup API 224 may be similar to the URL lookup API with a difference that the user can provide multiple URLs in a single call (or request to check a URL). With a plurality/bulk of URLs analyzed concurrently, the bulk URL lookup may increase the performance.

The host reputation API 227 may perform a search query into the threat intelligence database for a candidate domain or IP or to get the reputation of a specific host. The host reputation API may also lookup in the real-time scans results. The candidate domain or IP may be determined to be malicious or benign based on the look up. For example, the database may store hosts profiles with active indications of compromise (IOC). The domain or IP may be determined as malicious when it matches a domain or IP stored in the database with the IOC. In some cases, the host reputation API may be used when a URL address is not available. FIG. 5 shows examples of different host reputation API responses (in the JSON format) including "malicious" 501, "benign" 503 and "unrated" 505 (indicating there is a match but no reputation/IOC information is available).

The host URLs API 228 may issue a query for a host URL to receive all phishing URLs associated with the host. Each URL associated with the host may then be examined using the URL lookup API for detailed analysis. The user may send a request for further analysis using the URL lookup API.

In some cases, the host report API 226 may be a web API. In some cases, the host report API may be capable of retrieving from the threat intelligence database a list of URLs (including one or more URLs) related to a host and generate a summary report to the host. The report may provide the host's reputation (e.g., malicious or benign). The report may further comprise detailed phishing forensics. The report may, for example, provide a screenshot of the host and/or sites associated with the host. In some cases, the report may be customizable. For example, a maximum number of URLs to be included in the report may be configurable.

The URL enrichment API 223 may provide enrichment data such as detailed forensics against a URL (which is found to be a phishing URL). As an example, the forensics provided by the URL enrichment API may comprise a download screenshot 2231, a download page HTML 2232, or a download page text 2233.

The threat intelligence database may be compiled by sourcing suspicious URLs in real-time using various techniques. In some embodiments, sourcing suspicious URLs may be performed using Spam Traps, SMS Traps, Social Media. In some cases, suspicious ad networks, a passive DNS, or a newly registered domain may be added to the threat intelligence database. The URLs in the threat intelligence database may then be further analyzed using the virtual browser to discover phishing sites. The resulting threat intelligence can be used for real-time blocking and faster URL and host reputation lookup.

The enrichment data and outputs from an API may be provided to a user in various forms. For example, a safe preview feature may be provided to a user or an API to provide more information regarding a blocked threat (e.g., webpage) in a convenient manner. The safe preview may include at least a thumbnail image or screenshot of the phishing site that is browsed from the virtual browser as described above along with details about the threat. A user or an API may share (e.g., download or share) the Safe Preview of the blocked page with other users to warn them and for training purpose.

The messaging analysis and enrichment interface 203 may comprise message scan 231, message lookup 232, sender reputation 233, and reports 234. In some cases, the phishing attack may be embedded within an email message. Conventional anti-phishing security may be conducted using manual techniques to inspect potential phishing emails and may overlook genuine threats, or waste time and effort manually researching false positives. The PAEC comprising API interfaces (e.g., a URL analysis and enrichment interface, and a messaging analysis and enrichment interface) may provide an automated system to identify threats with higher accuracy. The URL analysis and enrichment interface, and the messaging analysis and enrichment interface may be used to inspect the source of the phishing attempt and provide detailed forensic evidence (e.g., screenshots of the phishing site, HTML, or rendered text) to a user as described herein. In some cases, out-of-band virtual browser analysis may be performed in the cloud by scanning the suspicious URLs in response to a real-time scanning request.

Message Analysis Engine

Figure 3:
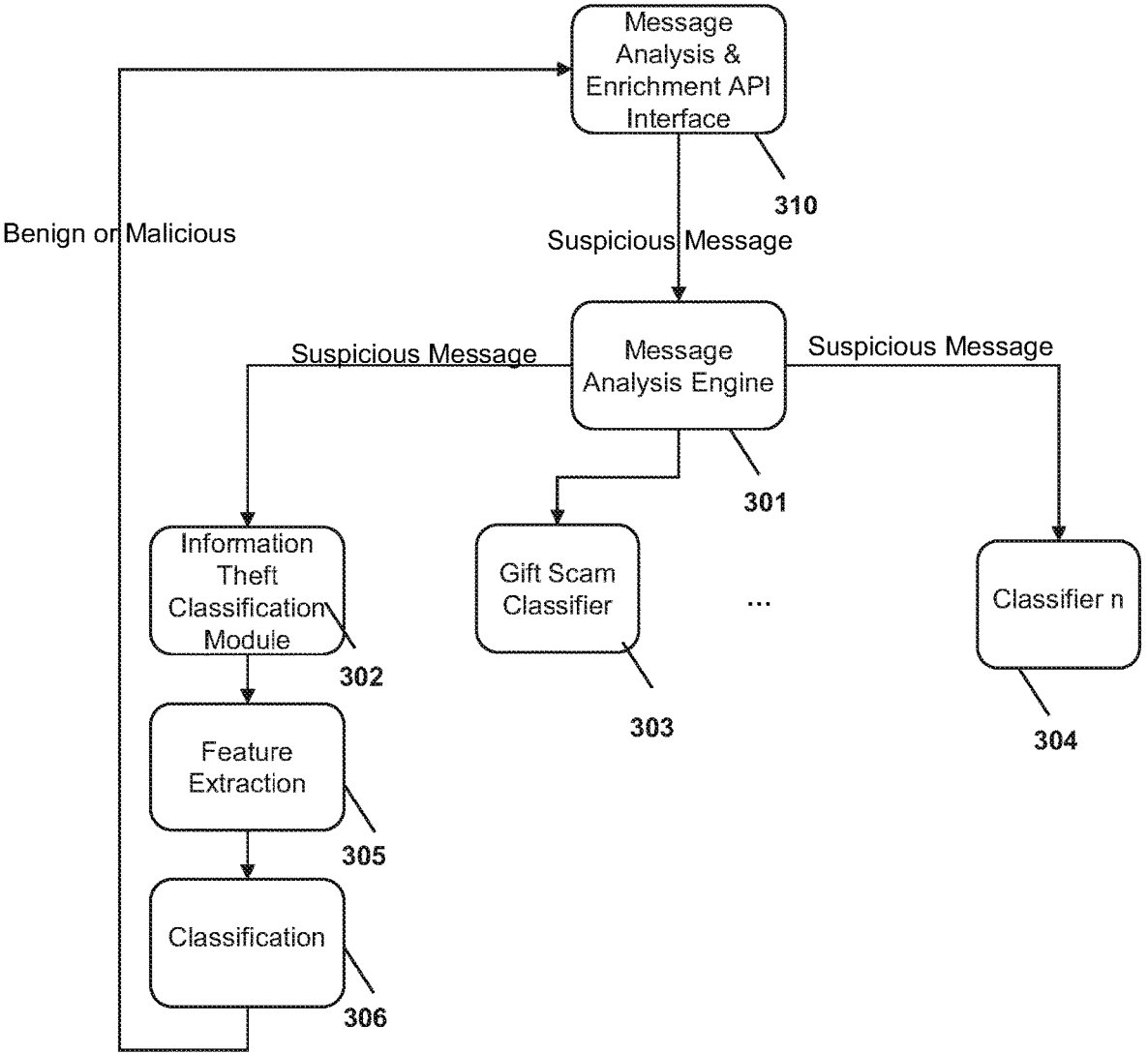
FIG. 3 schematically illustrates data flows between a message analysis and enrichment interface and a message analysis engine, in accordance with some embodiments.

The messaging analysis and enrichment APIs may be in communication with a message analysis engine. A message analysis engine may be configured to receive potential phishing messages from an API Interface (similar to messaging analysis and enrichment interface 105 shown in FIG. 1) to perform classification and confirm if the message belongs to a particular class of phishing attempts. The system may be configured to detect messages that may belong to different phishing classes. FIG. 3 illustrates a schematic workflow of the message analysis engine 301 and messaging analysis and enrichment API 310. As shown in FIG. 3, a suspicious message may be provided to the message analysis engine 301 by the message analysis and enrichment API interface 310. Message analysis engine 301 may comprise one or more classifiers to classify the suspicious message into two or more different phishing attempt classifications. For example, the plurality of classifications may comprise a rouge software install, an information theft, a financial scam, a gift scam, a scareware scam, a credential stealing, or others.

In some embodiments, the message analysis engine 301 may comprise a set of classifiers or trained models for classifying the input data (e.g., suspicious message). In some cases, the message analysis engine may comprise a rouge software install classifier, an information theft classification module 302, a gift scam classifier 303, a financial scam classifier, a scareware scam classifier, a credential stealing classifier, and/or other classifiers (e.g., classifier n 304). In some cases, each of the one or more classifiers in the message analysis engine may be trained using machine learning method (e.g., Natural Language Processing), a deep learning method, or a combination thereof. The one or more classifiers in the message analysis engine may be trained or developed using a supervised learning algorithm(s), an unsupervised learning algorithm(s), or a combination thereof. The machine learning algorithm can be any type of machine learning network such as: a support vector machine (SVM), a naïve Bayes classification, a linear regression model, a quantile regression model, a logistic regression model, a random forest, a neural network, convolutional neural network CNN, recurrent neural network RNN, a gradient-boosted classifier or repressor, or another supervised or unsupervised machine learning algorithm (e.g., generative adversarial network (GAN), Cycle-GAN, etc.

The one or more classification modules (e.g., information theft classification module 302, a gift scam classifier 303, a financial scam classifier, a scareware scam classifier, a credential stealing classifier, classifier n 304) in the message analysis engine are designed to classify messages of different phishing classes, as described herein. In some embodiments, each classifier may extract a plurality of features based on a class of phishing attempt it may classify. For example, the information theft classification module 302 may comprise a feature extraction module 305 which may provide features that can classify the threat 306 as benign or malicious. In some cases, the classification may be solely based on the language processing of the message. In some other cases, the classification may be based in part on the language analysis of the message.

In some embodiments, the plurality of features used by the classification modules may comprise shared features (e.g., features shared by two or more of the classification modules) and classifier-specific features (e.g., features that may be specific to a classification module). The shared features may be relevant to all or a subset of the classifiers. Non-limiting examples of the shared features may include a length of the message, a presence of an email address, a presence of a phone number, a number and/or types of errors in the write up (e.g., a typographical error, or a grammatical error), sender's historical messages (e.g., number of messages sent by the same sender, a classification of messages from the sender that has been previously analyzed), sender's geolocation (e.g., based on the area code of a phone number identified in the message), a service used by the sender to send the message (e.g., a free messaging service, a paid cellular network, etc.).

In some cases, the classifier-specific features may be derived from the language commonly used in the phishing messages of the corresponding class. For example, features specific to a financial scam classifier may comprise a presence of a financial institutes name (e.g., known banks, or credit unions), one or more words, phrases, or clauses frequently used in financial scam messages but not in benign messages, a language for asking money transfer to an account, and/or other features.

As described above, the message analysis engine may comprise a set of classifiers trained to determine/predict is a message belongs to a phishing class. An information theft class may aim to detect if the message is trying to steal user information. In some cases, an attacker directly asks for sensitive information over the message pretending to be a trusted entity. In some instances, the message may contain a phishing link leading to a credential-stealing page. A rouge software install class may include messages aiming to lure the user install rogue software. In some cases, the rogue software is sent via an attachment to a message. In some cases, the message may contain a phishing link leading to a rogue software download page. The financial scam phishing class may comprise scams and phishing attempts associated with financial crime. Examples of financial scam phishing may include money transfer scams, where users may be socially engineered into sending money, including cryptocurrencies, to attackers. The gift scam class may comprise messages aiming to create a sense of excitement for their victims and ask them for credit card information to claim a gift or a product at a fraction of the cost. Scareware scams class may aim to create a sense of fear for their victims and ask them to take an action. For example, an attacker may fake a security alert and ask a victim to call or email a fake support center to resolve the issue.

Figure 4:
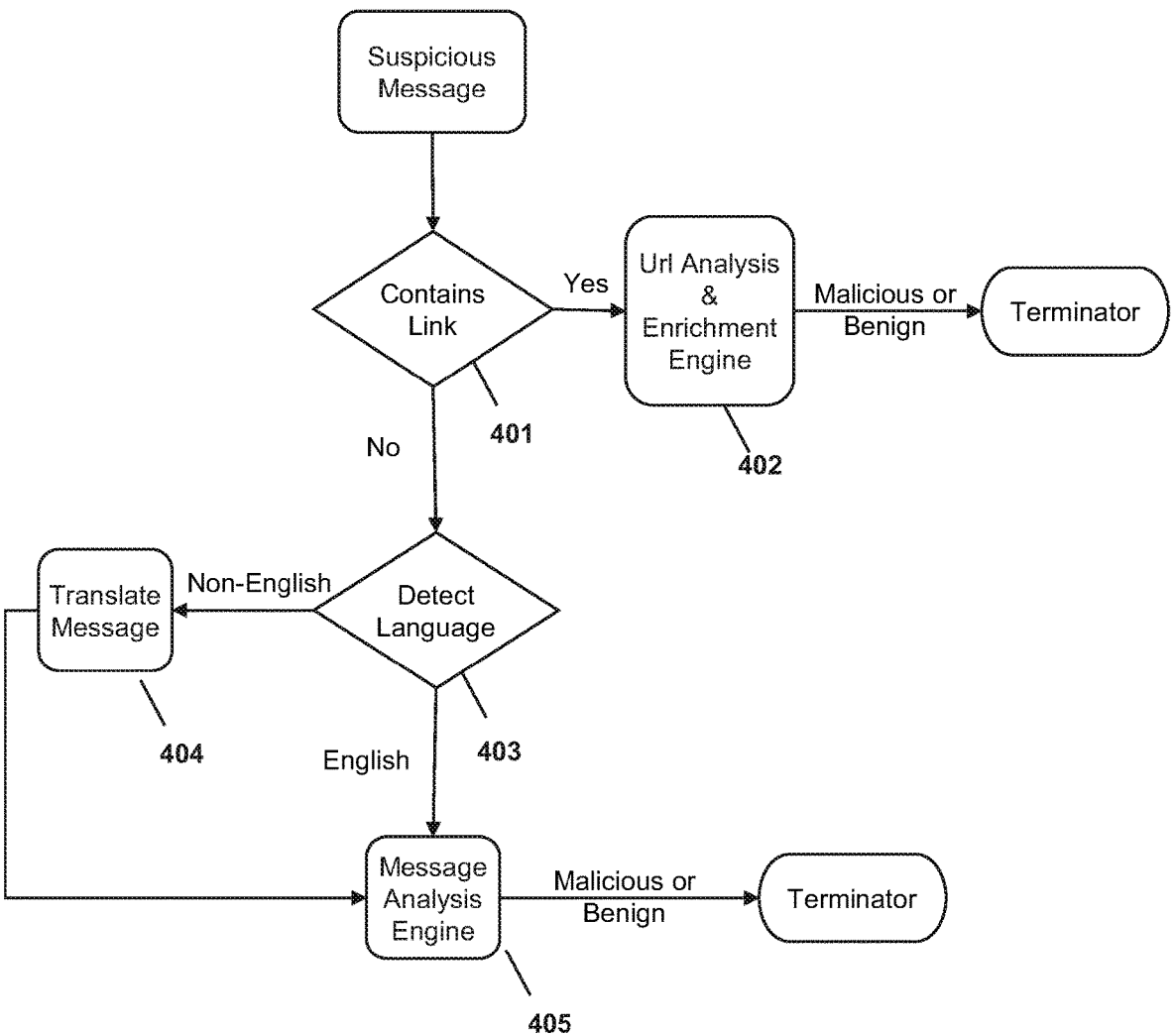
FIG. 4 illustrates a schematic diagram for detecting a malicious message, in accordance with some embodiments.

The classification system may process and classify a message with aid of a URL analysis and enrichment engine, a message analysis engine or a combination of both. FIG. 4 is a flowchart showing an exemplary process performed by the message analysis engine 405 and URL analysis and enrichment engine 402 to classify a message. In some cases, the process may comprise a first operation of selecting a classifier based on whether the message contain a link and a second operation of determining whether the message is benign or malicious using the selected classifier. In some cases, the output of the process is that an input message may be classified as malicious or benign.

In some cases, a suspicious message may be processed by a link inspection module 401 to detect whether the message contain a URL link or links. If the message contains any links the message may be further inspected by the URL analysis and enrichment engine 402. For example, if the link is identified as malicious by the URL analysis and enrichment engine, the message may be automatically classified as phishing/malicious. In some cases, when a message is classified as malicious or benign the processing may be terminated. Alternatively or additionally, a message that contains a link identified as not malicious may still be potentially malicious and may be further processed by the message analysis engine.

In some cases, link inspection module 401 does not detect a link or when a message does not contain a link, it may be sent to the message analysis engine 405. In some cases, the message may be first analyzed by a language detection module 403 before providing the message to the message analysis engine 405. In some cases, the message may be in a language other than English. The message may be translated to English by a translating module 404. The message in English language may then be provided to the message analysis engine 405. The message analysis engine, as described above, may then perform a deep inspection of the message. The message analysis engine may classify the message as benign or malicious and/or further classify message into one of the phishing classes, as described hereinbefore.

Classifier Training

In some embodiments, the classification modules may employ supervised learning, semi-supervised learning or un-supervised learning techniques to train the plurality of classifiers. For example, the classifiers may be self-learning classifiers. In another example, the un-supervised learning model network may be used for feature extraction. In some embodiments, the model may comprise an autoencoder. During a feature extraction operation, the autoencoder may be used to learn a representation of an input data for dimensionality reduction or feature learning. The autoencoder can have any suitable architecture such as a classical neural network model (e.g., sparse autoencoder, denoising autoencoder, contractive autoencoder) or variational autoencoder (e.g., Generative Adversarial Networks). In some embodiments, a sparse autoencoder with an RNN (recurrent neural network) architecture, such as LSTM (long-short-term memory) network, may be trained to regenerate the inputs for dimensionality reduction. For example, an encoder-decoder LSTM model with encoder and decoder layers may be used to recreate a low-dimensional representation of the input data to the following model training despite a latent/hidden layer. In some cases, the process of training a predictive model may comprise extracting unsupervised features from network data streams or network data flow. The input data for training the classifier(s) can be two-dimensional array or high-dimensional depending on the structure of the classifier. In some embodiments, the network flow data may not include labeled dataset. In some cases, the extracted features and the output of the autoencoder (e.g., low-dimensional representation of the input data) may be used for training one or more classifiers for extracting protocol features or active features, determining phishing attempt (e.g., malicious message) or a class thereof (e.g., a rouge software install, an information theft, a financial scam, a gift scam, a scareware scam, or a credential stealing). The classifiers can be of any suitable type, including but not limited to, KNN (k-nearest neighbor), support vector machine (SVM), a naïve Bayes classification, a random forest, decision tree models, convolutional neural network (CNN), feedforward neural network, radial basis function network, recurrent neural network (RNN), deep residual learning network and the like.

Each of the classifiers developed to detect and classify a particular class of phishing (e.g., a rouge software installs, an information theft, a financial scam, a gift scam, a scareware scam, or a credential stealing) may be trained using a training dataset. For example, the training dataset may comprise phishing SMS data as well as benign messages with no phishing purpose. The SMS data may be labeled into one or more phishing classes as mentioned herein. In some cases, benign messages may be simulated or collected from messaging sources (e.g., SMS honeypots), tweets or social media posts. In some cases, labeling of the training dataset may be performed by a human expert.

One or more performance metrics of the classifier may be calculated to determine the model performance. For instances, each of the classifiers in the message analysis engine may have an accuracy metric calculated as the percentage of threats that are correctly identified. The phishing analysis engine or classifiers thereof may be configured to determine a threat (e.g., SMS, phishing email, phone call, etc.) with an accuracy of at least about 50%, at least about 55%, at least about 60%, at least about 65%, at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more than about 99%. In some cases, the accuracy of the phishing analysis engine may be about 99.99%.

In some cases, a message analysis engine and/or each of the one or more classifiers thereof may have a precision (or positive predictive value PPV) metric calculated as the number of messages correctly classified compared to all the cases that were classified positively for a phishing class. For example, PPV may be calculated as number of cases correctly classified as phishing messages compared to all the cases classified as phishing messages. The phishing analysis engine or classifiers thereof may be configured to determine a threat (e.g., SMS, phishing email, phone call, etc.) with an PPV of at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more than about 99%. In some cases, the precision of the phishing analysis engine or a classifier thereof may be about 99.99%. In some cases, the precision of the phishing analysis engine or a classifier thereof may be about 100%.

In some cases, a message analysis engine and/or each of the one or more classifiers thereof may have a recall (or sensitivity) metric where the recall value may be calculated as the number of messages correctly classified as a phishing message or a class thereof compared to all the cases that actually contained a phishing message. The phishing analysis engine or classifiers thereof may be configured to determine a threat (e.g., phishing email, SMS, phone call, etc.) with an recall calculate of at least about 70%, at least about 75%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, or more than about 99%. In some cases, the recall value of the phishing analysis engine or a classifier thereof may be about 95% to about 97%. In some cases, the recall value of the phishing analysis engine or a classifier thereof may be about 96%. Any other suitable performance metrics may be used to assess the classifier performance.

Multiple classifiers were developed, each designated to detect a particular class of phishing attempts. The performance of the model may depend on the volume and/or quality of the training dataset. The system and method herein may collect sufficient Phishing SMS data to generate training dataset. In some cases, a global network of SMS honeypots may be setup using SMS Gateway Services to collect the phishing SMS data. Multiple phone numbers from various Geolocations maybe acquired and published online via Social Media, Yellow Pages, and other online outlets. Phone number collection codes (e.g., spiders that crawl the web to collect numbers) may be used to collect these numbers and supply the numbers to phishing sources. Messages received at the honeypot numbers over many months resulted in thousands of phishing SMS from a variety of sources. The phishing message may be collected from various regions and languages. Once the data was collected, phishing messages may be labeled into multiple phishing classes by human experts to generate a labeled dataset. Alternatively or additionally, the messages may be labeled using labeling program with little user interaction.

In some embodiments, the system may adopt data augmentation techniques to augment the training dataset. For example, in order to generate non-phishing data, benign SMS data may be simulated. To simulate benign SMS data, benign marketing messages may be collected at the honeypots and millions of benign tweets may be acquired and labeled manually. These messages may be used to simulate additional benign message data such as by inducing permutations.

In order to validate and examine the performance of the classifiers, 5-fold validation method was used. The classifiers showed a precision of 100% calculated as the true positives/(true positives+false positives). True positive was defined as a message classified correctly as a phishing message and/or a class thereof. The classifiers showed a recall value of 96% calculated as the true positives/(true positives+false negative). A false negative was defined as a message that was incorrectly labeled as benign, while the message was a phishing message. The classifiers showed an accuracy of 99.99% calculated as the (true positives+true negative)/(total number of classified data).

Enterprise APIs

The PAEC system may be configured to integrate with other APIs including, for example, original equipment manufacturer (OEM) APIs or enterprise APIs. In some cases, PAEC may comprise an on-demand threat intelligence (OTI) web APIs. The OTI web APIs may be used to automate phishing incident response (e.g., by security operation teams). In some cases, the OTI web APIs may require authentication with an OTI could. The OTI web APIs may comprise a variety of function including, but not limited to, host reputation, real-time URL scan, forensics data on scanned URLs or other functions. In some cases, the OTI web API is used to determine the reputation of a host. This may be performed by scanning IoC threat intelligence database as well as real-time scans results. Such network-based cyber attack analysis backend methods and analysis engine can include those described in U.S. application Ser. No. 15/878,792 entitled "Method And System For Protection Against Network-Based Cyber Threats," which is incorporated by reference herein in the entirety. In some cases, the OTI web API can be used to get the real-time scan of a target URL. The URL reputation scan results may be provided in form of a JSON file by the URL reputation web API. FIG. 6 shows an example of a response returned by a URL reputation API. The API response may include information about a landing URL, a final destination URL, and the threat information associate with them respectively (e.g., threat status, threat type, last seen, first seen, etc.). The OTI web API may also be used to obtain a real-time scan of a target URL in blocking mode (e.g., a URL scan in synchronous mode). In some cases, the OTI web API is used to obtain a list of URLs related to a specific host from the threat intelligence database The OTI web API may be used to download a screenshot against a previous real-time scan of a target URL IoC using a threat detection technology. The OTI web API may also be used to download an HTML or a text against a previous real-time scan of a target URL. In some cases, the OTI web API can be used to get the status of quota indicating the API usage.

Original Equipment Manufacturer (OEM) APIs

The PAEC herein may be configured to integrate with original equipment manufacturer (OEM) APIs. In some cases, PAEC may comprise a real-time phishing lookup API (RTPL). The RTPL may provide a unified API interface to integrate real-time URL reputation and/or scanning capabilities into platforms and products of a user. In some cases, the RTPL module allows users to check the reputation of one or more URLs in a single call. In some cases, the maximum number of URLs allowed in a single API call may be configurable. The RTPL API may be connected with a real-time intelligence database continuously updated with the latest phishing threats. In some cases, RTPL API returns phishing URL detail upon matching the URL with a URL in the real-time intelligence database. The RTPL API may also return meta information of the phishing URL (e.g., in JSON format). The meta data information may be provided to a user (e.g., SDK, SOAR, SIEM, etc.). An example of the meta information of the phishing URL provided in JSON format is provided hereinbelow.

```
{
    "total_received_urls": 1,
    "total_benign_urls": 0,
    "total_malicious_urls": 1,
    "total_invalid_urls": [ ],
    "malicious_urls_details": [
        {
            "scanned_url":          "https://bad.com/index.php",
                "scanned_url_type": "Normal",
            "active": "Yes",
            "associated_urls": [ ]
        }
    ]
}
```

The API herein may be capable of returning an API call with the URL lookup result within a short period of time. For instance, a single call may comprise a response time per API of about 150 milliseconds (ms) to about 600 ms. For example, when benchmarked on a one URL lookup in a single call, the response time per API was about 160 ms. In another example, when benchmarked on a 100 URLs lookup in a single call, the response time per API was about 300 ms. In another example, when benchmarked on a 500 URLs lookup in a single call, the response time per API was about 550 ms.

A malicious URL may belong to three or more different logical groups comprising redirector, shared domain, or normal. In some cases, URLs under the redirector category may be intermediate URLs that eventually land to a phishing URL after a web redirect (e.g., a redirector includes URL shorteners and redirect services offered by marketing automation tools.) Redirector hosts may not be blacklisted or assumed to be malicious. URLs belonging to the shared domain category may belong to a benign cloud service. In some cases, the cloud service is abused by a threat actor (e.g., a phishing source). For example, a phishing source may be hosted on a cloud (e.g., Box, Google Drive, etc.). Shared domains may not be blacklisted or assumed to be malicious. URLs that don't fall into the above two categories or any malicious categories may be classified as normal.

In some cases, the PAEC system may be used for abuse inbox management. Increased cyber awareness training and single-click reporting of suspicious emails have created a new problem for SOC (security operations center) and IR (incident response) teams: effectively managing a growing abuse inbox with limited resources. Even with automated playbooks, inaccurate or inconclusive phishing threat intelligence may cause teams to miss genuine threats, or waste time and effort manually researching false positives. Phishing analysis and enrichment cloud (PAEC) systems and methods disclosed herein may fill this gap by providing greater accuracy and threat coverage with automated phishing URL analysis & Enrichment capabilities. Virtual browser technology systems and methods disclosed herein may dynamically inspect page contents to identify phishing threats while simultaneously retrieving detailed forensic evidence, including screenshots, HTML, and rendered text.

The virtual browser, as described in FIG. 1, may be used to analyze behavior and content of a suspected URL as described above. In some cases, artifacts such as screenshot, text, and HTML are extracted from the rendered page to detect the presence of a phishing attack. The artifacts such as the screenshot may also be provided to an API (e.g., an enterprise API, or an OEM API) or to a user for education purposes. For instance, when a URL is blocked, a request may be sent to the PAEC for a copy of the screenshot that it had stored at the time of detection. The screenshot or other artifacts may be then delivered to a user or provided to an API, for example, as a warning alert or as a preview of the phishing site.

Furthermore, PAEC may be used for phishing threat hunting. Phishing attacks have surpassed malware infections in recent years. For instance, targeted attacks that were carried out by APT malware and RAT toolkits are getting replaced by more evasive phishing campaigns with malicious aims beyond credential stealing. A lack of accurate, phishing-focused threat detection and intelligence has made it difficult to identify phishing attempts in suspicious emails and C2 connections buried in network and endpoint logs. URL Analysis and Enrichment APIs disclosed herein may effectively identify and remediate phishing threats on compromised machines faster with real-time webpage analyses.

In some cases, if a match between a URL and the database is not found, the URL may be sent to another module for runtime scanning via the virtual browser and/or machine learning classifiers. The scanning process may not necessarily block the API call. The scanning may result in a malicious classification of the URL. The URL may then be added to the database (e.g., threat intelligence database). A subsequent RTPL API call may identify the URL after a re-check of the status of the URL compared to the dataset. The scanning may take about 10 seconds (s) to about 5 minutes (min). In some cases, the scanning time is proportionate to the number of URLs submitted. In some case, the API response time may be directly proportional to the number of URLs supplied in a single API call. In other words, the higher the number, the slower the response. Alternatively, the system may employ parallel processing thereby reducing the scanning time.

The PAEC system may be further used for cloud-service abuse management. Popular cloud and web services may be a prime target for hackers to host phishing sites. These cloud services' highly reputable domains and infrastructures may provide a perfect cover to hide phishing footprints. Prime examples include threat actors hosting phishing sites on cloud platforms (e.g., Amazon, Google Cloud, and Microsoft Azure). Phishing emails may be sent through email marketing platforms, Phishing sites hosted on free hosting providers and survey services, etc. These platforms may leverage PAEC to detect abuse within their infrastructure and take remediation actions.

The messaging analysis & enrichment APIs may be used for social media & messaging platform abuse management. Social Media and messaging services (e.g., WhatsApp, Facebook, Snapchat, Skype etc.), can be an active target for phishers to launch phishing attacks. Phishing messages sent through these platforms may employ social engineering techniques to lure users. The messaging analysis & enrichment APIs may be used to scan these messages in real-time to block and quarantine phishing campaigns.

The messaging analysis & enrichment APIs may also be used for SMS pipe filtration. SMS (or text messaging) may be another popular infection vector. Mobile Carriers and Cellular companies can use messaging analysis & enrichment APIs to scan SMS (or Text) in real-time and block phishing texts and/or senders.

Web Application

In some cases, a computer program includes a web application. In light of the disclosure provided herein, those of skill in the art will recognize that a web application may utilize one or more software frameworks and one or more database systems. A web application, for example, is created upon a software framework such as Microsoft® .NET or Ruby on Rails (RoR). A web application, in some instances, utilizes one or more database systems including, by way of non-limiting examples, relational, non-relational, feature oriented, associative, and XML database systems. Suitable relational database systems include, by way of non-limiting examples, Microsoft® SQL Server, mySQL™, and Oracle®. Those of skill in the art will also recognize that a web application may be written in one or more versions of one or more languages. In some cases, a web application is written in one or more markup languages, presentation definition languages, client-side scripting languages, server-side coding languages, database query languages, or combinations thereof. In some cases, a web application is written to some extent in a markup language such as Hypertext Markup Language (HTML), Extensible Hypertext Markup Language (XHTML), or eXtensible Markup Language (XML). In some cases, a web application is written to some extent in a presentation definition language such as Cascading Style Sheets (CSS). In some cases, a web application is written to some extent in a client-side scripting language such as Asynchronous Javascript and XML (AJAX), Flash© Actionscript, Javascript, or Silverlight®. In some cases, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some cases, a web application is written to some extent in a database query language such as Structured Query Language (SQL). A web application may integrate enterprise server products such as IBM® Lotus Domino®. A web application may include a media player element. A media player element may utilize one or more of many suitable multimedia technologies including, by way of non-limiting examples, Adobe® Flash®, HTML 5, Apple® QuickTime®, Microsoft® Silverlight®, Java™, and Unity®.

Web Browser Plug-In

A computer program, in some aspects, includes a web browser plug-in. In computing, a plug-in, in some instances, is one or more software components that add specific functionality to a larger software application. Makers of software applications may support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. The toolbar may comprise one or more web browser extensions, add-ins, or add-ons. The toolbar may comprise one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

In some cases, Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. The web browser, in some instances, is a mobile web browser. Mobile web browsers (also called mircrobrowsers, mini-browsers, and wireless browsers) may be designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Mobile Application

In some instances, a computer program includes or is integrated into a mobile application provided to a mobile digital processing device. The mobile application may be provided to a mobile digital processing device at the time it is manufactured. The mobile application may be provided to a mobile digital processing device via the computer network described herein.

A mobile application is created by techniques known to those of skill in the art using hardware, languages, and development environments known to the art. Those of skill in the art will recognize that mobile applications may be written in several languages. Suitable programming languages include, by way of non-limiting examples, C, C++, C#, Featureive-C, Java™, Javascript, Pascal, Feature Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments may be available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some cases, a computer program includes or is integrated into a standalone application (e.g., SDKs, SOARs, SIEMs, etc.). The standalone application is a program that may be run as an independent computer process, not an add-on to an existing process, e.g., not a plug-in. Those of skill in the art will recognize that standalone applications are sometimes compiled. In some instances, a compiler is a computer program(s) that transforms source code written in a programming language into binary feature code such as assembly language or machine code. Suitable compiled programming languages include, by way of non-limiting examples, C, C++, Featureive-C, COBOL, Delphi, Eiffel, Java™, Lisp, Python™, Visual Basic, and VB .NET, or combinations thereof. Compilation may be often performed, at least in part, to create an executable program. In some instances, a computer program includes one or more executable complied applications.

Software Module

The methods, and systems disclosed herein frequently comprise one or more software, servers, and database modules, or use of the same. In view of the disclosure provided herein, software modules may be created by techniques known to those of skill in the art using machines, software, and languages known to the art. The software modules disclosed herein may be implemented in a multitude of ways. In some cases, a software module comprises a file, a section of code, a programming feature, a programming structure, or combinations thereof. A software module may comprise a plurality of files, a plurality of sections of code, a plurality of programming features, a plurality of programming structures, or combinations thereof. By way of non-limiting examples, the one or more software modules comprise a web application, a mobile application, and/or a standalone application. Software modules may be in one computer program or application. Software modules may be in more than one computer program or application. Software modules may be hosted on one machine. Software modules may be hosted on more than one machine. Software modules may be hosted on cloud computing platforms. Software modules may be hosted on one or more machines in one location. Software modules may be hosted on one or more machines in more than one location.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The section headings used herein are for organizational purposes only and are not to be construed as limiting the subject matter described.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A phishing analysis and detection system comprising:
one or more cloud-based analysis interfaces configured to:
receive network session activity in an application programing interface (API) call from at least one existing security software or existing security application deployed to an endpoint device and determine whether the network session activity is malicious by matching the network session activity to a malicious source,
upon a match, return an API response to the end point device wherein the API response comprises an enrichment information including a malicious verdict indicative of detection of a phishing attack,
upon a mismatch, classify the network session activity into one or more phishing classes of a phishing attack using a plurality of machine learning algorithm trained classifiers and return an API response to the end point device and wherein the API response comprises an enrichment information including the one or more phishing classes of the phishing attack; and
one or more application programing interfaces (APIs) configured to:
integrate the one or more cloud-based analysis interfaces into the at least one existing security software or existing security application on the endpoint device and provide real-time phishing attack enrichment information to the at least one existing security software or existing security application on the endpoint device by:
i) receiving the API call from the at least one existing security software or existing security application on the endpoint device, wherein the API call comprises the network session activity,
ii) generating and returning the API response to the API call in real-time, wherein the API response comprises the enrichment information in a JSON format.

2. The phishing analysis and detection system of claim 1, wherein the one or more cloud-based analysis interfaces are configured to further block the phishing attack and provide a safe preview of the blocked phishing attack.

3. The phishing analysis and detection system of claim 1, wherein the one or more cloud-based analysis interfaces comprise a first analysis interface for uniform resource locator (URL) analysis and enrichment and a second analysis interface for message analysis and enrichment.

4. The phishing analysis and detection system of claim 3, wherein the first analysis interface is coupled to a virtual browser analysis module deployed on a cloud.

5. The phishing analysis and detection system of claim 4, wherein the virtual browser analysis module is configured to collect forensic intelligence on a candidate webpage behavior during an interaction with the candidate webpage within a virtual browser.

6. The phishing analysis and detection system of claim 5, wherein the virtual browser analysis module is further configured to identify phishing attack based on the forensic intelligence and return information about the phishing attack to the virtual browser analysis module.

7. The phishing analysis and detection system of claim 5, wherein the enrichment information comprises a preview of the candidate webpage if the phishing attack is detected.

8. The phishing analysis and detection system of claim 4, wherein the virtual browser analysis module is configured to follow a URL and the phishing attack in multiple stages and analyze a destination webpage of the phishing attack.

9. The phishing analysis and detection system of claim 3, wherein the second analysis interface is coupled to a message analysis engine comprising a set of machine learning algorithm trained classifiers for classifying the network session activity.

10. The phishing analysis and detection system of claim 9, wherein the set of machine learning algorithm trained classifiers correspond to a set of phishing classes and each of the set of machine learning algorithm trained classifiers is configured to extract features based on the corresponding phishing class.

11. The phishing analysis and detection system of claim 10, wherein the features comprise a subset of features shared by two or more of the set of machine learning algorithm trained classifiers.

12. The phishing analysis and detection system of claim 10, wherein the features comprise a subset of features specific to one of the set of machine learning algorithm trained classifiers.

13. The phishing analysis and detection system of claim 1, further comprising a link inspection module configured to detect whether the network session activity contains a URL link prior to analyzing the network session activity with the one or more analysis interfaces.

14. The phishing analysis and detection system of claim 1, wherein the one or more application programing interfaces (APIs) comprise a web API providing the API response related to a reputation of a host or a reputation of a URL in a web API format.

15. The phishing analysis and detection system of claim 1, wherein a single API call comprises a configurable number of network session activities to be analyzed by the one or more cloud-based analysis interfaces.

16. A method for phishing analysis and detection comprising:
receiving, by one or more cloud-based analysis interfaces, network session activity from at least one existing security software or existing security application deployed to an endpoint device in an application programing interface (API) call, wherein the one or more cloud-based analysis interfaces are integrated into the at least one existing security software or the existing security application on the endpoint device by one or more application programing interfaces (APIs);

determining, by the one or more cloud-based analysis interfaces, whether the network session activity is malicious by matching the network session activity to a malicious source;

upon a match, returning an API response comprising an enrichment information including a malicious verdict indicative of detection of a phishing attack; and upon a mismatch, classifying the network session activity into one or more phishing classes of a phishing attack using a plurality of machine learning algorithm trained classifiers of the one or more cloud-based analysis interfaces and returning an API response to the endpoint device, wherein the API response comprising an enrichment information including the one or more phishing classes of the phishing attack, wherein the one or more APIs are configured to provide real-time phishing attack enrichment information to the at least one existing security software or the existing security application on the endpoint device by:

i) receiving the API call from the at least one existing security software or the existing security application on the endpoint device, wherein the API call comprises the network session activity, ii) generating and return an API response to the API call in real-time, wherein the API response comprises the enrichment information in a JSON format.

17. The method of claim 16, wherein the one or more cloud-based analysis interfaces comprise a first analysis interface for uniform resource locator (URL) analysis and enrichment and a second analysis interface for message analysis and enrichment.

18. The method of claim 17, wherein the first analysis interface is coupled to a virtual browser analysis module deployed on a cloud.

19. The method of claim 16, wherein the one or more application programing interfaces (APIs) comprise a web API providing the API response related to a reputation of a host or a reputation of a URL in a web API format.

20. The method of claim 16, wherein a single API call comprises a configurable number of network session activities to be analyzed by the one or more cloud-based analysis interfaces.

* * * * *